Dec. 30, 1930. J. M. BENSINGER 1,787,352
SCOOP SCALE
Filed April 11, 1928
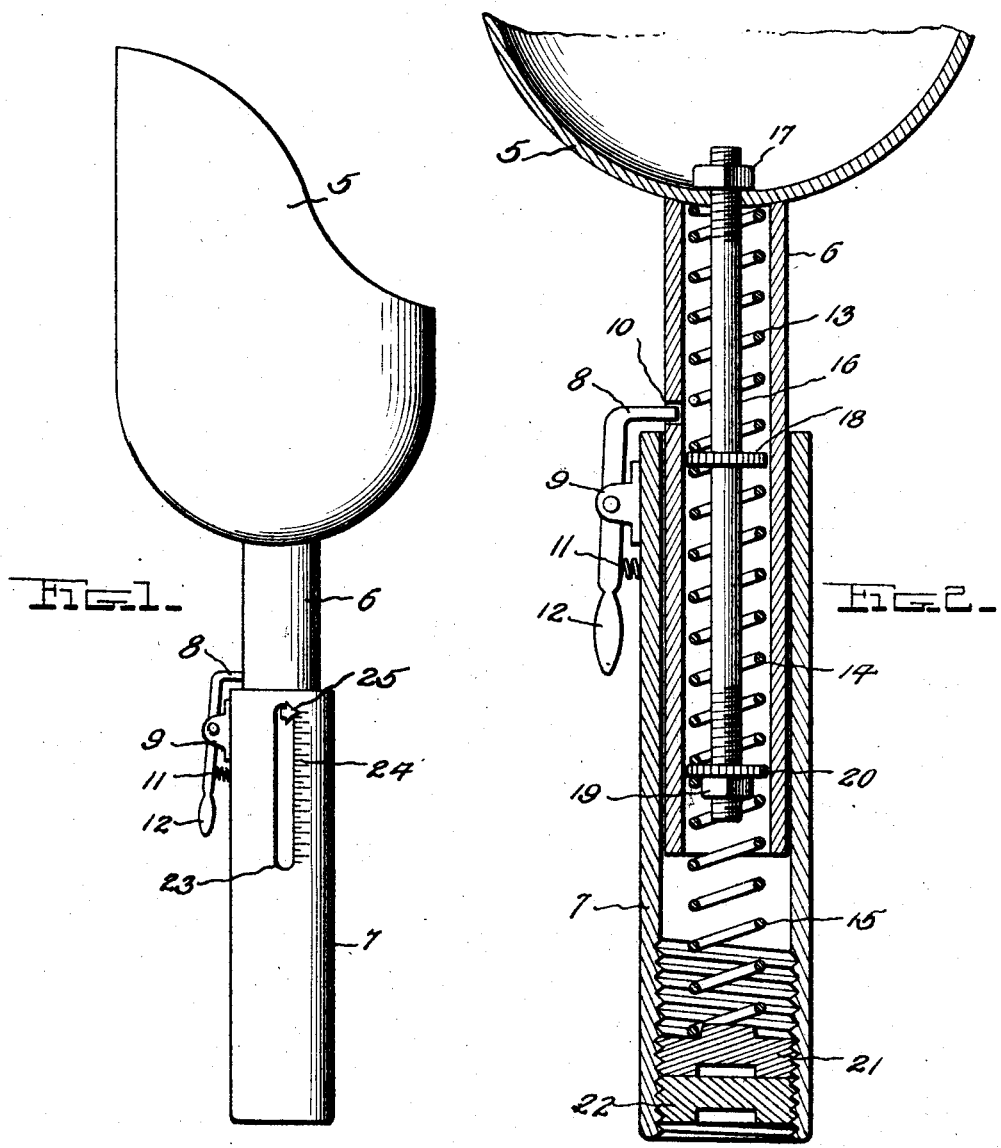
Inventor
J. M. Bensinger.
By Townsend + Townsend
Attorneys Patented Dec. 30, 1930

1,787,352

UNITED STATES PATENT OFFICE

JAMES M. BENSINGER, OF GADSDEN, ALABAMA, ASSIGNOR OF ONE-HALF TO ALEXANDER HOWELL, OF GADSDEN, ALABAMA

SCOOP SCALE

Application filed April 11, 1928. Serial No. 269,053.

This invention relates to weighing apparatus and has particular reference to hand scales of the scoop type.

Among the objects which the invention has in view are: to provide a novel spring mechanism for scoop scales; to provide in a scoop scale, a novel means for adjusting the scale springs; to provide in a spring scoop scale, means for locking the relatively movable scale parts against movement; to provide in a scale of this character, a manually releasable lock means for controlling the relative movement between elements of the scale; and generally to provide a novel and improved structural arrangement of elements in spring operated scoop scales.

With these and such other objects in view as will be apparent from the description, the invention resides in the novel construction, combination and arrangement of parts hereinafter described and claimed and illustrated in the accompanying drawings wherein is shown one practical, physical embodiment of the principles of my invention.

Figure 1 is an elevation of a scoop scale constructed in accordance with the invention.

Figure 2 is an enlarged vertical section taken therethrough.

In detail, the invention comprises the conventional scoop 5 supported at the end of a tubular standard 6 which is longitudinally slidable within a tubular handle member, relative movement between the standard and the handle being prevented as desired by the engagement of a latch 8 pivoted between lugs 9 carried on the standard, into an aperture 10 formed for the purpose in the body of the standard. The latch 8 is normally held in locking position by the spring 11 and may be released by depression of its handle portion 12 against the body of the handle 7 so that the weighing action of the scale may be effected when the device is held upright in a vertical position.

Within the tubular chamber formed by the standard and the handle are disposed a plurality of coil expansion springs, preferably three in number as at 13, 14 and 15, which springs surround an adjusting rod 16 disposed longitudinally within the standard 6 and passed through the bottom of the scoop 5 at one end for threaded engagement with an adjusting nut 17 in the scoop.

The rod 16 carries intermediate its ends a rigidly attached stationary washer or collar 18 of substantially the same diameter as the internal diameter of the bore of the standard 6. This member 18 provides a bearing for one end of the upper spring 13, which spring has its opposite end in bearing engagement against the bottom of the scoop. The lower end of the rod 16 is threaded to receive the bottom adjusting nut 19 above which is disposed a movable washer 20 slidable over the rod 16 to provide a bearing for the lower end of the intermediate spring 14, the opposite end of which spring has a bearing against the rigid washer 18 carried by the rod.

Threaded internally into the lower end of the handle 7 is a spring adjusting nut 21, which forms a lower bearing for the lowermost spring 15 of the series, the opposite end of which spring has a bearing against the washer 20 above the nut 19. Following the nut 21 a jam nut 22 is threaded into the handle to provide an anchorage for the bottom adjusting nut 21.

The handle 7 is provided with a longitudinal slot 23, one side of which is provided with suitable indicia 24 for cooperation with a pointer 25 carried by the standard 6 and movable in the slots 23 under the relative movement between the parts.

In the operation of the scale the lock 8 is normally engaged in its recess 10 whereby to provide a rigid handle for the scoop so that the same may be utilized in scooping up the material to be weighed without causing any relative movement between the standard 6 and the handle 7. This is an important feature of the invention for the reason that it eliminates undue wear and stress upon the spring assembly. With the material received in the scoop the handle is brought to an upright vertical position and the latch handle 12 depressed to release the standard 6, permitting the weight of the material in the scoop to depress the standard and the rod 16 against the combined action of the three springs, giving the reading on the scale 24. It will be apparent that each component spring of the series may have an individual adjustment, the nut 17 effecting an adjustment of the upper spring 13; the nut 19 effecting an adjustment of the intermediate spring 14; and the nut 21 effecting an adjustment of the lower spring 15. By this arrangement the scale may be delicately adjusted to a very fine balance and the setting of the pointer 25 may be brought to any desired point on the scale 24 before weighing, depending upon the particular adjustment of the various springs.

While in this preferred embodiment of the invention I have illustrated and described certain details entering into the construction and operation thereof, I desire it to be understood that the invention is not to be limited thereto, but that any desired changes and modifications may be made in the structural details as will fall within the scope of the invention as claimed.

I claim:

1. A scoop scale comprising, a scoop, a tubular standard secured thereto, a tubular handle slidably receiving said standard, balance springs disposed in said standard and handle, an adjusting rod disposed longitudinally in said standard and extending through said scoop at one end, means on said rod for effecting individual adjustment of certain of said springs, and means carried by the handle for effecting individual adjustment of another of said springs.

2. In a scoop scale, the combination with a hollow handle member having a hollow standard slidable therein and provided with a scoop at its outer end, of an adjusting rod disposed in said standard, a spring bearing member rigidly attached to said rod intermediate its ends, a plurality of coiled expansion springs surrounding said rod and having a bearing against said bearing member, means on the opposite ends of said rod for adjusting said springs from opposite sides of said bearing member, an expansion spring disposed between the lower end portion of said rod and the bottom end of said handle, and means having threaded engagement with the bottom end of the handle for retaining and adjusting said last named spring.

In testimony whereof I affix my signature.

JAMES M. BENSINGER.